US006439463B1

(12) United States Patent
Bucci

(10) Patent No.: US 6,439,463 B1
(45) Date of Patent: Aug. 27, 2002

(54) CARD FEED AND READ MECHANISMS FOR TIME AND ATTENDANCE RECORDERS

(75) Inventor: George Bucci, Southington, CT (US)

(73) Assignee: Pyramid Technologies LLC, Meriden, CT (US)

( * ) Notice: Subject to any disclaimer, the term of this patent is extended or adjusted under 35 U.S.C. 154(b) by 0 days.

(21) Appl. No.: 09/595,411

(22) Filed: Jun. 16, 2000

Related U.S. Application Data

(60) Provisional application No. 60/139,951, filed on Jun. 18, 1999.

(51) Int. Cl.[7] .......... G06K 13/00
(52) U.S. Cl. .......... 235/475; 235/483
(58) Field of Search .......... 235/475, 479, 235/483

(56) References Cited

U.S. PATENT DOCUMENTS 3,825,727 A * 7/1974 Sarcia .......... 235/61.11 R
5,616,910 A * 4/1997 Kawashima et al. .......... 235/479

* cited by examiner

*Primary Examiner*—Robert H. Kim
*Assistant Examiner*—Jurie Yun
(74) *Attorney, Agent, or Firm*—Maurice M. Klee

(57) ABSTRACT

A unitary guide and shield member (13) for use in guiding time cards (10) to a time and attendance recorder is provided. The guide and shield member serves to (1) guide the time card to feed rolls (16), (2) hold the time card at a substantially constant distance from a light source and a light sensor, and (3) protect the light sensor from ambient light.

3 Claims, 5 Drawing Sheets

CARD FEED AND READ MECHANISMS FOR TIME AND ATTENDANCE RECORDERS

CROSS REFERENCE TO RELATED PROVISIONAL APPLICATION

This application claims the benefit under 35 USC §119(e) of U.S. Provisional Application No. 60/139,951 filed Jun. 18, 1999 the content of which in its entirety is hereby incorporated by reference.

FIELD OF THE INVENTION

This invention relates to time and attendance recorders and, in particular, to card feed and read mechanisms for such recorders.

BACKGROUND OF THE INVENTION

The most common use of time and attendance recorders is to document the times and dates when employees are at work. Mechanical systems for marking paper time cards with a stamp indicating the time of day so as to document the hours of work of an employee have been in existence since the early 1900's. Over the years, such systems have become more sophisticated so that a variety of information can now be printed on a paper time card, including full date information which can be used in determining hours worked and the appropriate rate of pay for those hours.

A particularly "user friendly" system of this general type is the PTR-4000 Time Recorder sold by Pyramid Technologies of Meriden, Conn. This time and attendance recorder uses numbered paper time cards which are assigned to individual employees as needed. The cards have optically readable marks to encode the number of the card. Such a card 10 is shown in FIG. 1, where the optically readable marks which encode the number of the card are identified by the reference numeral 12. As shown in FIG. 1, card 10 also includes optically readable marks 11 which serve as a timing code for the reading of marks 12 and the printing of information on card 10.

The PTR-4000 Time Recorder includes an internal memory which stores information regarding the various card numbers. In this way, the total hours worked by an employee on a particular day and/or within a particular pay period can be printed on his or her card each time the card is used without the need to read detailed information from the card. Simply by reading the card number and referencing that number to the internal memory, the PTR-4000 Time Recorder can access all of the information needed to provide a complete printout on the card of the information needed by the employer to prepare its payroll and by the employee to confirm that the time he or she has worked has been properly recorded.

Although the PTR-4000 has worked successfully for several years, it has suffered from some disadvantages. In particular, the reading of optically readable marks 11 and 12 has been subject to error. Errors in reading marks 11, i.e., the marks which serve as a timing code, result in either a card non-read or errors in the location at which information is printed on the card. Errors in reading marks 12, i.e., the marks which indicate the card number, result in the internal memory associating the wrong data with a particular employee which is a critical error from both the employee's and the employer's perspective.

In accordance with the invention, it has been determined that the errors in reading marks 11 and 12 arise from two sources: (1) variation in the spacing between the time card and the light source/optical sensor used to read the marks; and (2) variations in the amount of ambient light present at the light sensor.

SUMMARY OF THE INVENTION

In view of the foregoing, it is an object of this invention to improve the card feeding and reading systems used in time and attendance recorders. More particularly, it is an object of the invention to improve the reliability of such feeding and reading systems.

To achieve these and other objects, the invention in accordance with certain of its aspects provides apparatus for reading marks (11, 12) on a card (10), said card having a front surface and a back surface, said marks being on the front surface, said apparatus comprising:

(a) a light source (15) for illuminating a portion of the front surface of the card;

(b) a light sensor (15) for detecting light reflected from the front surface of the card;

(c) a base member (17) for supporting the back surface of the card; and (d) a unitary guide and shield member (13) spaced from the base member (17) and defining a channel (22) for receiving the card, said channel having an entrance end (22*a*) and an exit end (22*b*), said unitary guide and shield member comprising:

- (i) an entrance guide (19) at the entrance end (22*a*) of the channel for guiding the card into the channel and shielding the light sensor from ambient light;
- (ii) an aperture (20) for receiving both the light source and the light sensor; and
- (iii) a guide surface (21) for engaging the front surface of the card to maintain a substantially constant distance between said front surface and both said light source and said light sensor.

Figure 1:
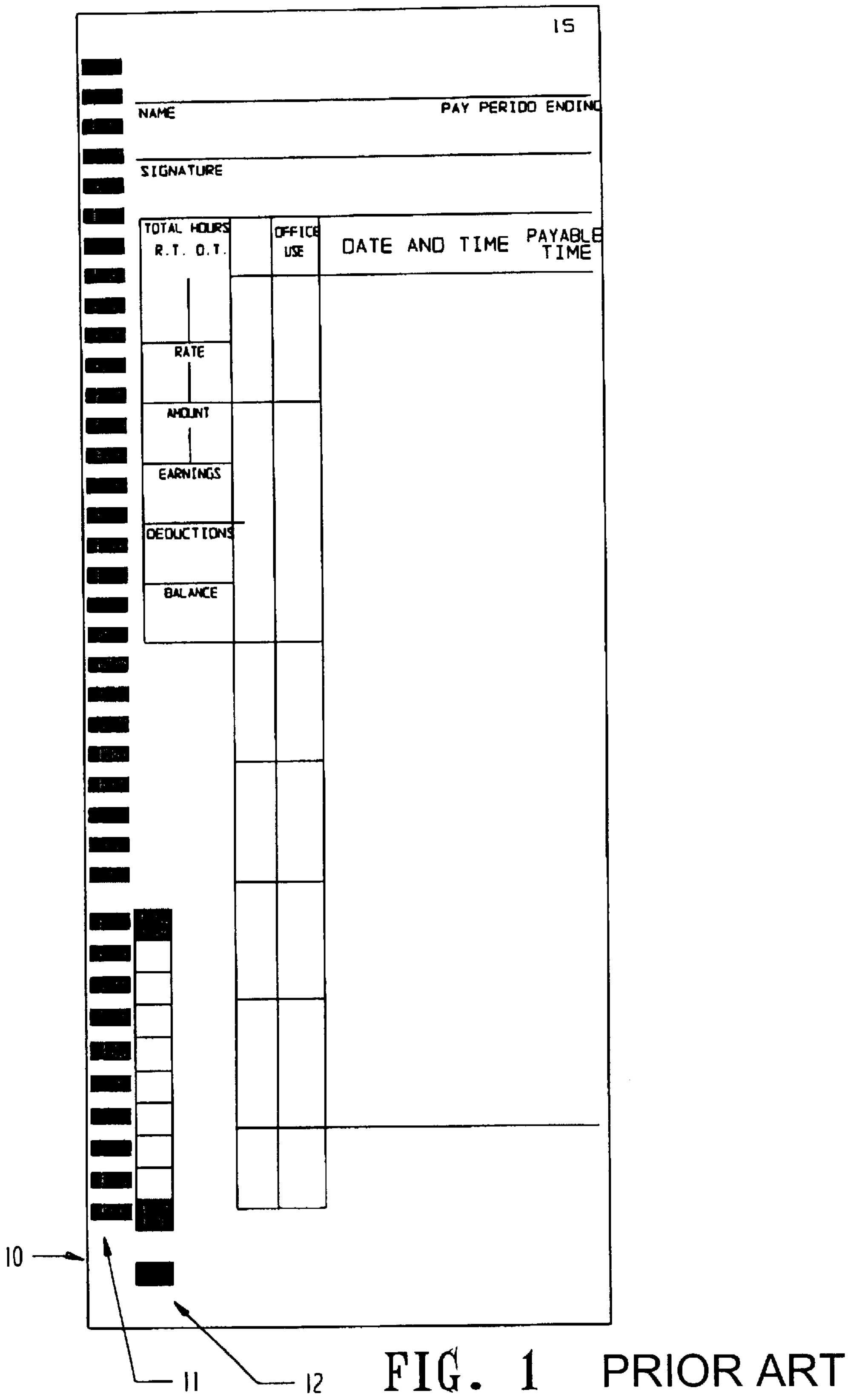
FIG. 1 PRIOR ART
FIG. 1 is a plan view showing a prior art paper time card.

The foregoing drawings, which are incorporated in and constitute part of the specification, illustrate the preferred embodiments of the invention and together with the description, serve to explain the principles of the invention. It is to be understood, of course, that both the drawings and the description are explanatory only and are not restrictive of the invention. The drawings are not intended to indicate scale or relative proportions of the elements shown therein.

The reference numbers used in the drawings correspond to the following:

10 paper time card
11 optically encoded timing marks (clock)
12 optically encoded card number (data)
13 unitary guide and shield member
14 prior art card guide
15 light source/light sensor
16 time card feed rollers

17 base member
18 cover
19 entrance guide
20 aperture for light source/light sensor
21 guide surface
22 channel
22*a* entrance end of channel
22*b* exit end of channel

DETAILED DESCRIPTION OF THE INVENTION

Figure 2:
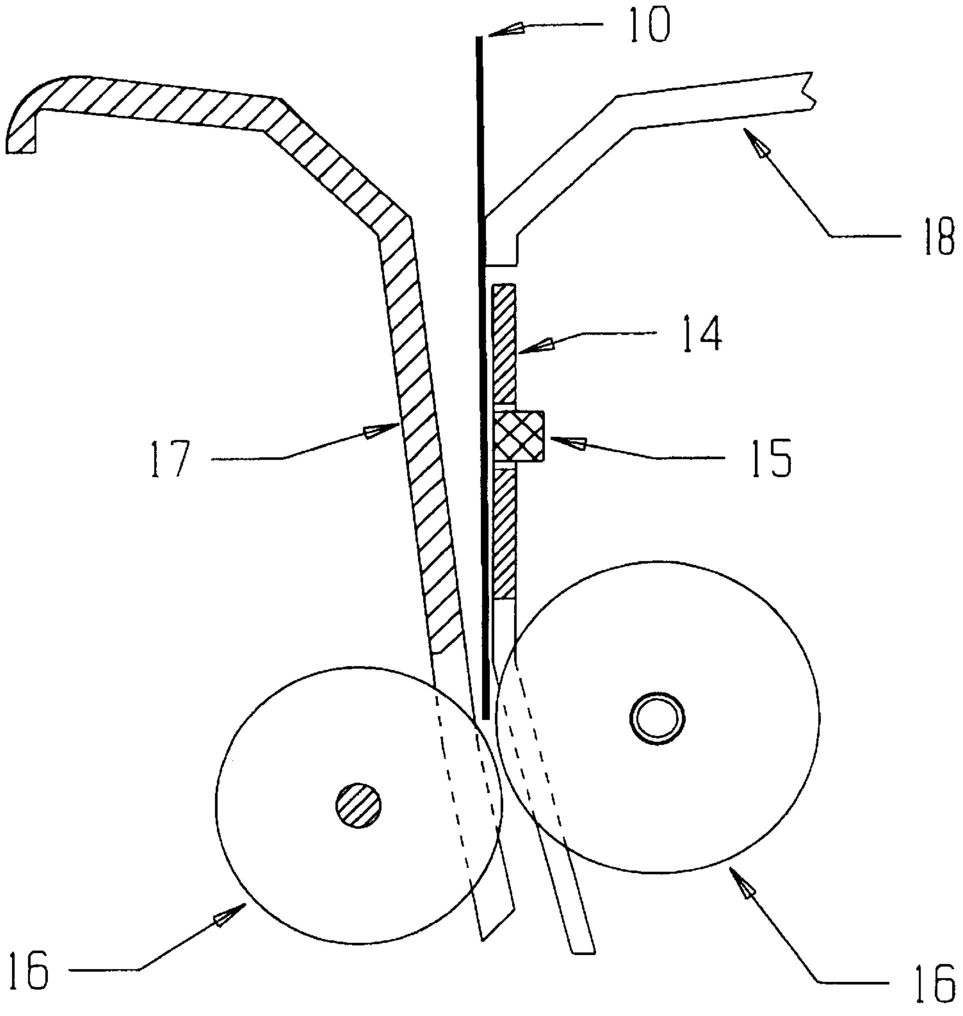
FIG. 2 PRIOR ART
FIGS. 2 and 3 are cross-sectional, schematic drawings illustrating prior art time card guiding apparatus.
Figure 3:
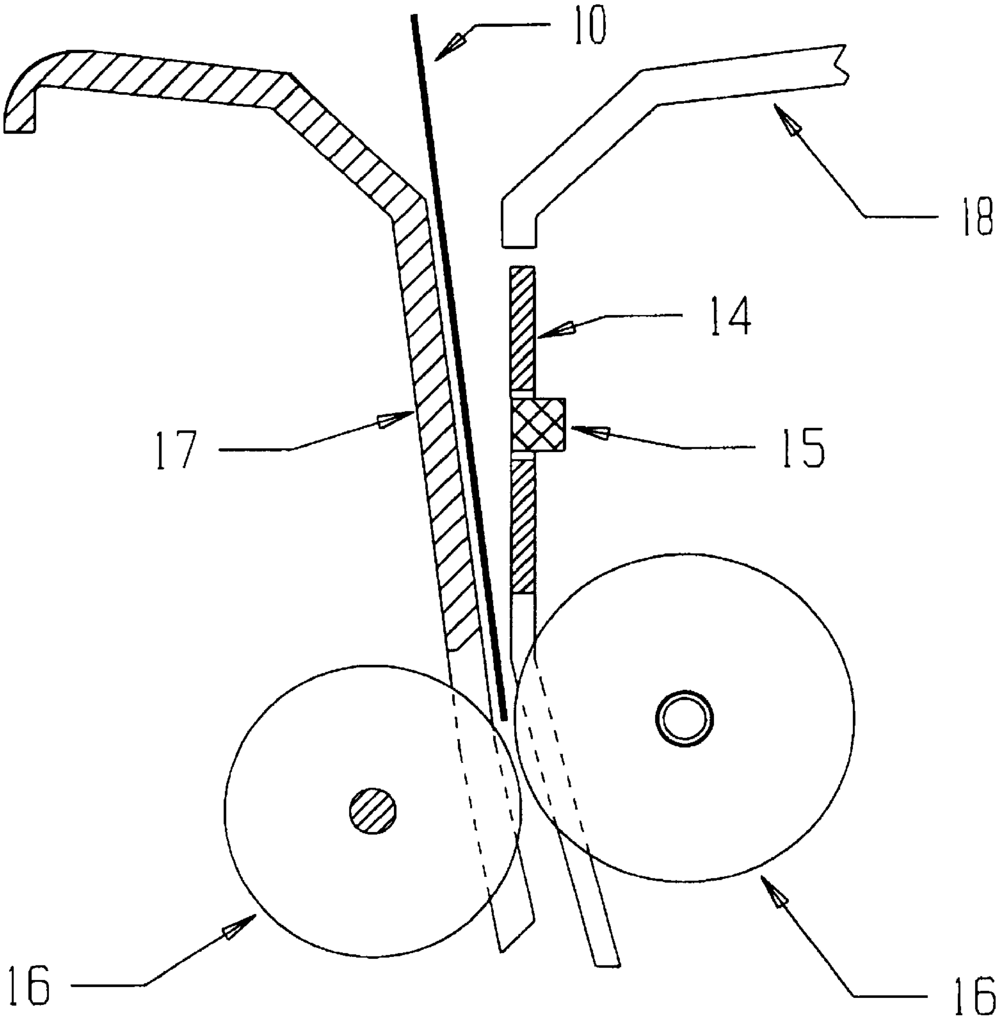
FIG. 3 PRIOR ART

FIGS. 2 and 3 show a prior art card feed and read mechanism which suffered from problems of erratic reading of marks 11 and 12. As shown in these figures, the mechanism includes rollers 16 for engaging the leading edge of card 10 and also includes a cover 18 leading to card guide 14 which carries light source/light sensor 15.

Figure 4:
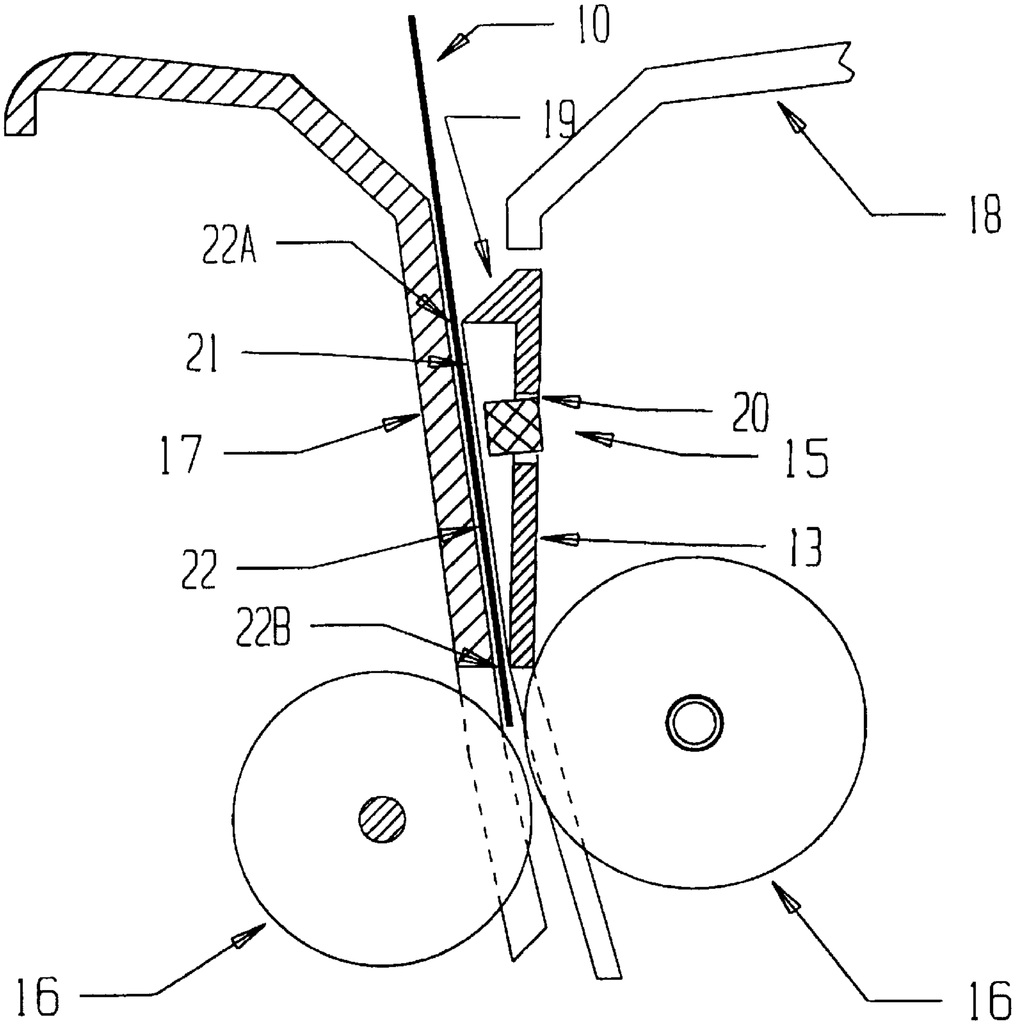
FIG. 4 is a cross-sectional, schematic drawing illustrating the unitary guide and shield member of the invention.

In FIGS. 2–3, as well as in FIG. 4, light source/light sensor 15 is shown displaced a substantial distance from rollers 16. In practice, light source/light sensor 15 is placed closer to the feed rollers. Light source/light sensor 15 can be, for example, an integrated infrared generator/detector of the type available from various semiconductor manufacturers. Two light source/light sensor combinations are used, one for reading marks 11 and another for reading marks 12.

FIGS. 2 and 3 illustrate the wide variations possible in the location of card 10 with respect to light source/light sensor 15. In FIG. 2, the card is located too close to the light source/light sensor 15 which can result in either a complete or partial blocking of the light exit face of the source and/or the light entrance face of the sensor. Such blocking results in a significant shift in the offset of the sensor towards black thus resulting in a false detection of black, i.e., black is found where the card is actually white.

FIG. 3 illustrates the normal undisturbed location for the card where its distance from light source/light sensor 15 is optimized. Unfortunately, this configuration permits ambient light to reach the sensor thus resulting in a false detection of white, i.e., white is found where the card is actually black.

As card 10 is fed by rollers 16, it tends to vibrate and move away from base member 17. In some cases, the card can move far enough to assume the position of FIG. 2. Thus, during use of the prior art card feed and read mechanism, a time card can assume essentially any position between those shown in FIGS. 2 and 3.

As card 10 moves through these positions, its tendency to create reading errors changes. Thus, as discussed above, in the position of FIG. 2, the bias is to read black, while in the position of FIG. 3, the bias is to read white. In between, the bias is to read progressively whiter as the card comes closer to the source/sensor until it gets so close as to block the light and/or the sensor and thus read black. Accordingly, during the reading of any individual card, the bias can change from black to white and back to black on a random basis as the card vibrates in a random manner.

It should be noted that card vibration does not occur every time a card is fed and read by the prior art mechanism. Rather, it occurs on an irregular and infrequent basis, thus constituting an "intermittent" error in the reading of cards, but nevertheless a serious problem in the utility of the time and attendance recorder. As with any intermittent error, the source of this error was difficult to isolate and indeed was not found by prior workers in the field.

Furthermore, since infrared detectors were used and since indoor lighting contains only a minimal amount of infrared light, the ambient light problem resulting from exposure to direct sunlight at certain customer's facilities was never seen during development or manufacture of the recorder. Again, the source of this error in card reading was difficult to isolate and was not identified by prior workers in the field.

FIG. 4 illustrates the solution to the above problems provided by the present invention. As shown therein, motion of card 10 is restricted by unitary guide and shield member 13, thus eliminating the distance sensitivity problems experienced in the prior art. Unitary guide/shield 13 includes aperture 20 for receiving light source/light sensor 15.

To guide card 10 into channel 22, unitary guide/shield 13 includes entrance guide 19 which provides a smooth lead-in surface for the card. In addition to guiding the card, entrance guide 19 also shields the sensor from ambient light, specifically, ambient sunlight.

Unitary guide/shield 13 also includes guide surface 21 for holding the card at a substantially constant distance from light source/light sensor 15. Thus, in the prior art mechanism of FIGS. 2–3, the relative position of card 10 with respect to light source/light sensor 15 varied between about 0.001 inches and about 0.130 inches, while with the unitary guide/shield of FIG. 4 this variation is reduced to between about 0.035 inches and about 0.045 inches, which in terms of optically reading marks 11 and 12 is a substantially constant distance.

Figure 5:
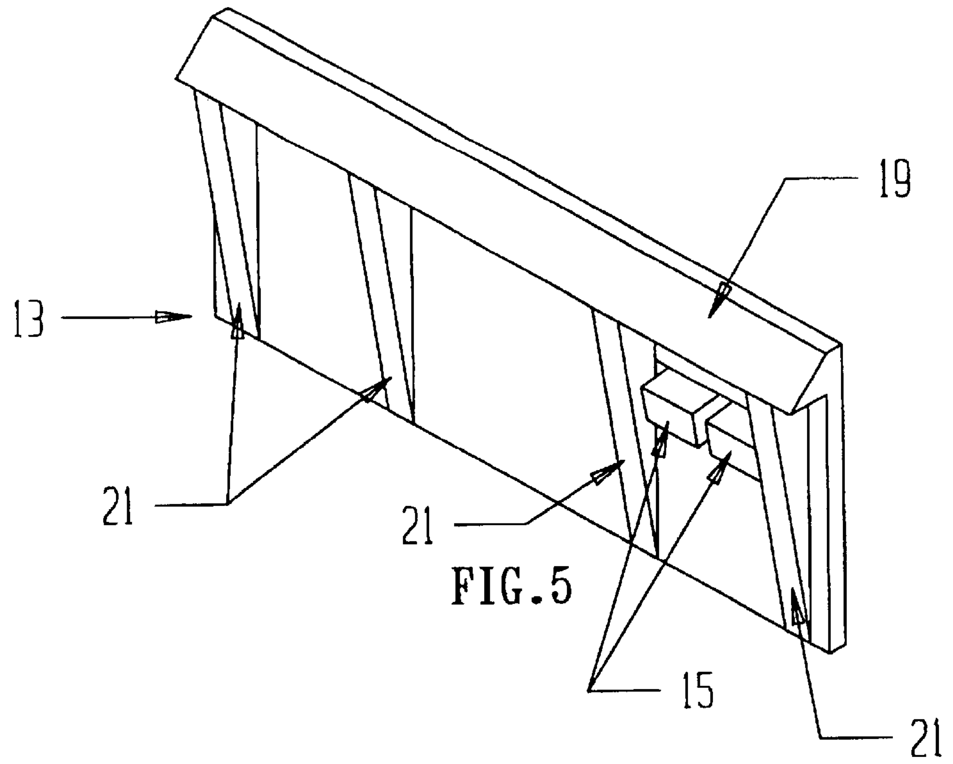
FIG. 5 is a perspective view of the unitary guide and shield member of FIG. 4.
Figure 6:
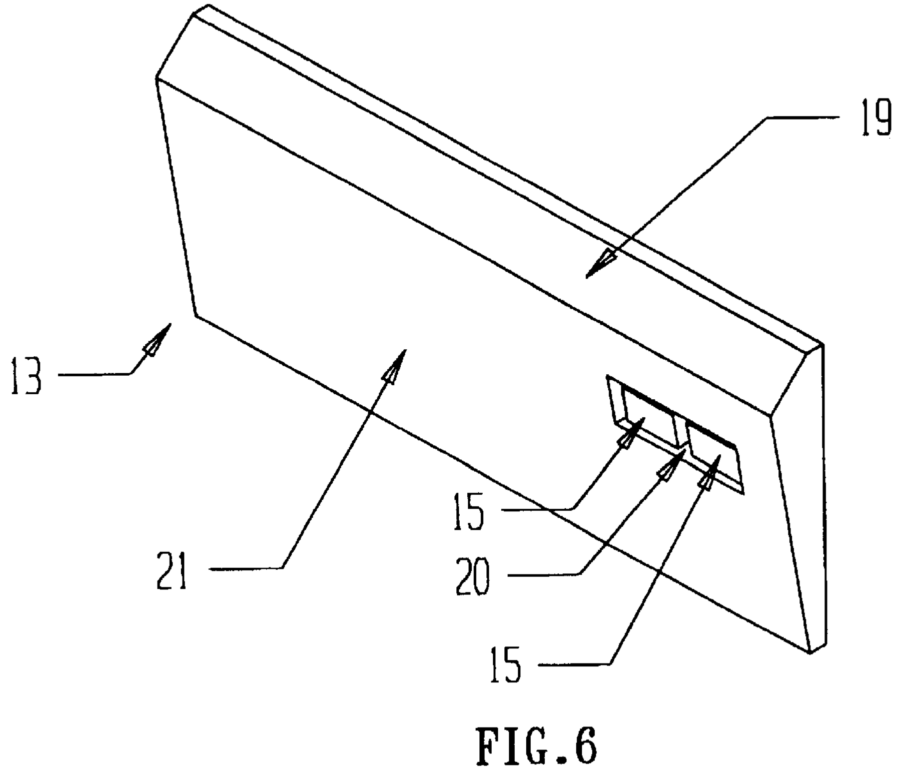
FIG. 6 is a perspective view of an alternate embodiment of the unitary guide and shield member of the invention.

As shown in FIG. 5, guide surface 21 can be composed of a plurality of ribs which contact the front surface of card 10. Alternatively, as shown in FIG. 6, guide surface 21 can be a solid plane. In either case, light source/light sensor 15 is spaced from the guide surface in a direction away from base member 17 to provide sufficient distance for light to exit the exit face of the light source, reflect from the front face of card 10, and enter the entrance face of the light detector.

As discussed above, the prior art card feed and read mechanism of FIGS. 2 and 3 suffered from card reading errors. Quantitatively, approximately 30% of PTR-4000 Time Recorders which used this mechanism generated customer service calls as a result of card reading errors. With the invention as illustrated in FIG. 4, the rate of customer service calls based on card read problems dropped to essentially zero.

Although preferred and other embodiments of the invention have been described herein, further embodiments may be perceived by those skilled in the art without departing from the scope of the invention as defined by the following claims.

What is claimed is:

1. Apparatus for reading marks on a card, said card having a front surface and a back surface, said marks being on the front surface, said apparatus comprising:

(a) a light source for illuminating a portion of the front surface of the card;

(b) a light sensor for detecting light reflected from the front surface of the card;

(c) a base member for supporting the back surface of the card; and (d) a unitary guide and shield member spaced from the base member and defining a channel for receiving the card, said channel having an entrance end and an exit end, said unitary guide and shield member comprising:

(i) an entrance guide at the entrance end of the channel for guiding the card into the channel and shielding the light sensor from ambient light;

(ii) an aperture for receiving both the light source and the light sensor; and (iii) a guide surface for engaging the front surface of the card to maintain a substantially constant distance between said front surface and both said light source and said light sensor.

2. The apparatus of claim 1 wherein the unitary guide and shield member has ribs which form the guide surface.

3. The apparatus of claim 1 wherein:

(i) said light source has a light exit face and said light sensor has a light entrance face, and (ii) both the light exit face and the light entrance face are spaced from the guide surface in a direction away from the base member.

* * * * *